Nov. 28, 1939.  K. SIEG  2,181,210
POWER TRANSMISSION MECHANISM
Filed May 18, 1939  2 Sheets-Sheet 1
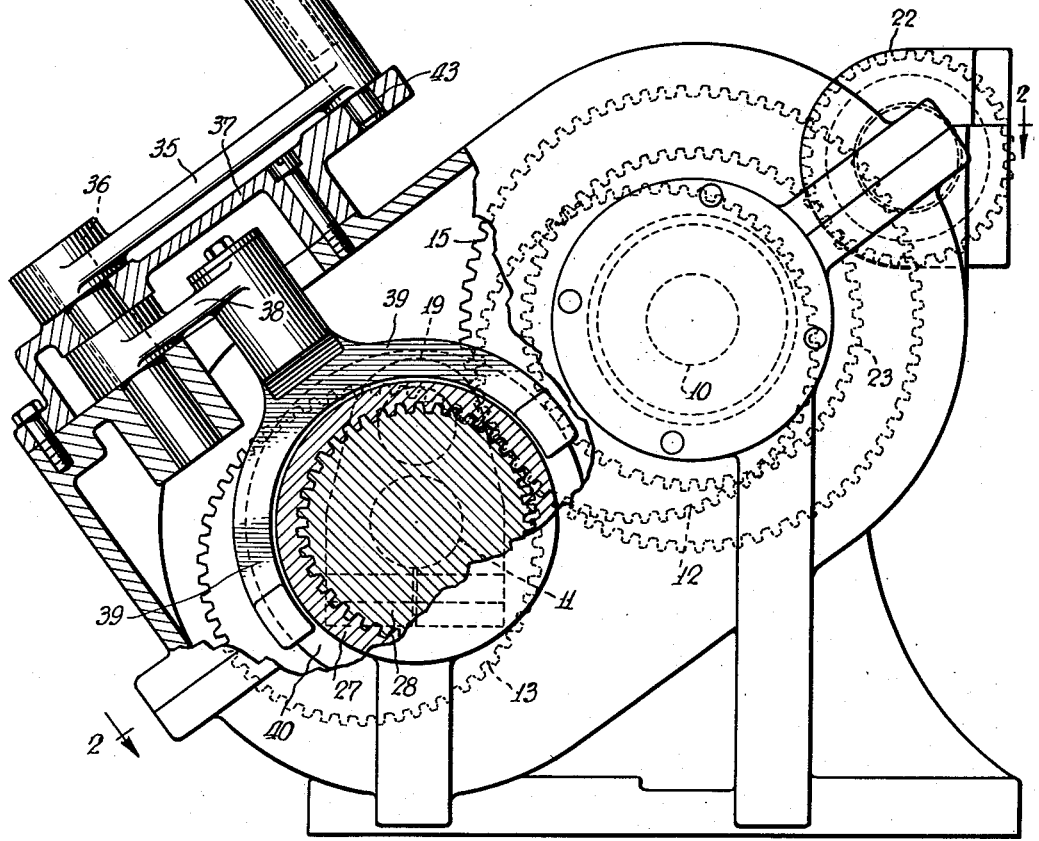
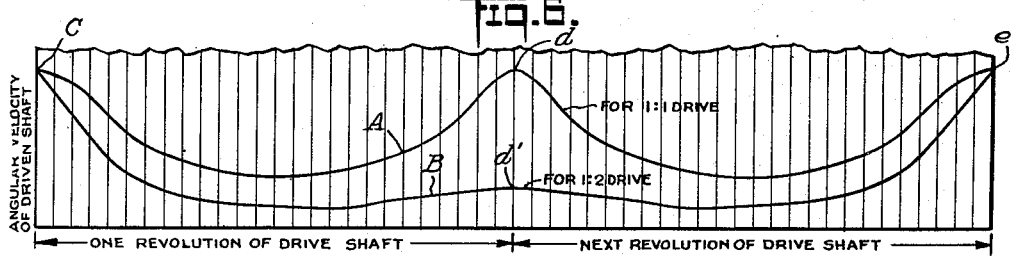
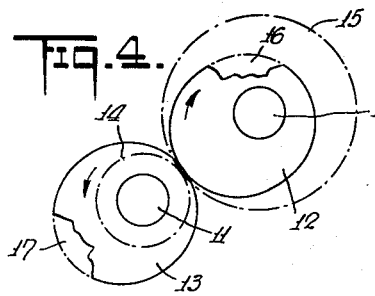
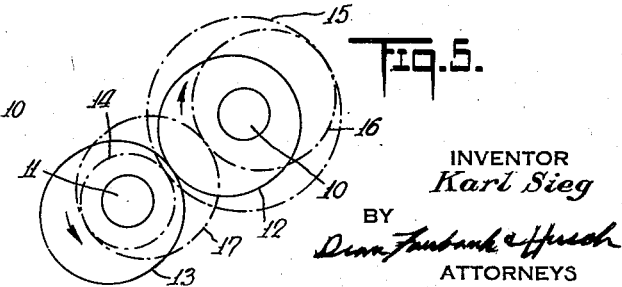
INVENTOR
*Karl Sieg*
BY
ATTORNEYS Nov. 28, 1939.  K. SIEG  2,181,210

POWER TRANSMISSION MECHANISM

Filed May 18, 1939  2 Sheets-Sheet 2

INVENTOR
Karl Sieg
BY
ATTORNEYS

Patented Nov. 28, 1939

2,181,210

UNITED STATES PATENT OFFICE 2,181,210

POWER TRANSMISSION MECHANISM

Karl Sieg, Philadelphia, Pa., assignor to Samuel M. Langston Co., a corporation of New Jersey Application May 18, 1939, Serial No. 274,335

18 Claims. (Cl. 74—325)

This invention relates to power transmission mechanism, and involves a combination and arrangement of parts, whereby angular velocity of a rotary driven member may be varied during each rotation, and whereby the total time cycle of a complete revolution of the driven member may be varied in respect to the time cycle of the driving member rotating with uniform angular velocity.

In carrying out the invention, there may be employed two variable speed transmission units in series, such as two pairs of elliptical gears or two eccentric throw-cranks or the like, and a speed change gearing, whereby power may be transmitted to the driven member through only one of the variable speed units, or through both of the variable speed units, and the speed change gearing.

A pair of elliptical gears or an eccentric throw-crank and a Reeves drive, with means for adjusting both the speed through the Reeves drive and the angular position of the elliptical gears or the eccentricity of the crank, has been used, so that the driven shaft may have the same angular velocity in a given portion of its cycle, regardless of changes in the total time cycle.

By means of the present invention, only one adjustment is necessary to obtain the same general result, and that by a simple shift in the speed change gearing. By the novel combination of speed change gearing and variable speed units, the shift in the speed change gearing throws in or out one of the variable speed units.

As a further important feature, the speed change gearing may include a 1:1 gearing and a 1:2 gearing, and may operate to connect the driven member through one of the variable speed units and the 1:1 drive, or through both variable speed units and the 1:2 drive.

As a further feature, the power transmission mechanism is such that the maximum velocity of the driven shaft is the same and occurs at the same portion of the cycle of the driven shaft, irrespective of whether the driven member be rotated as the same mean speed or as only half the mean speed of the driving member.

Figure 2:
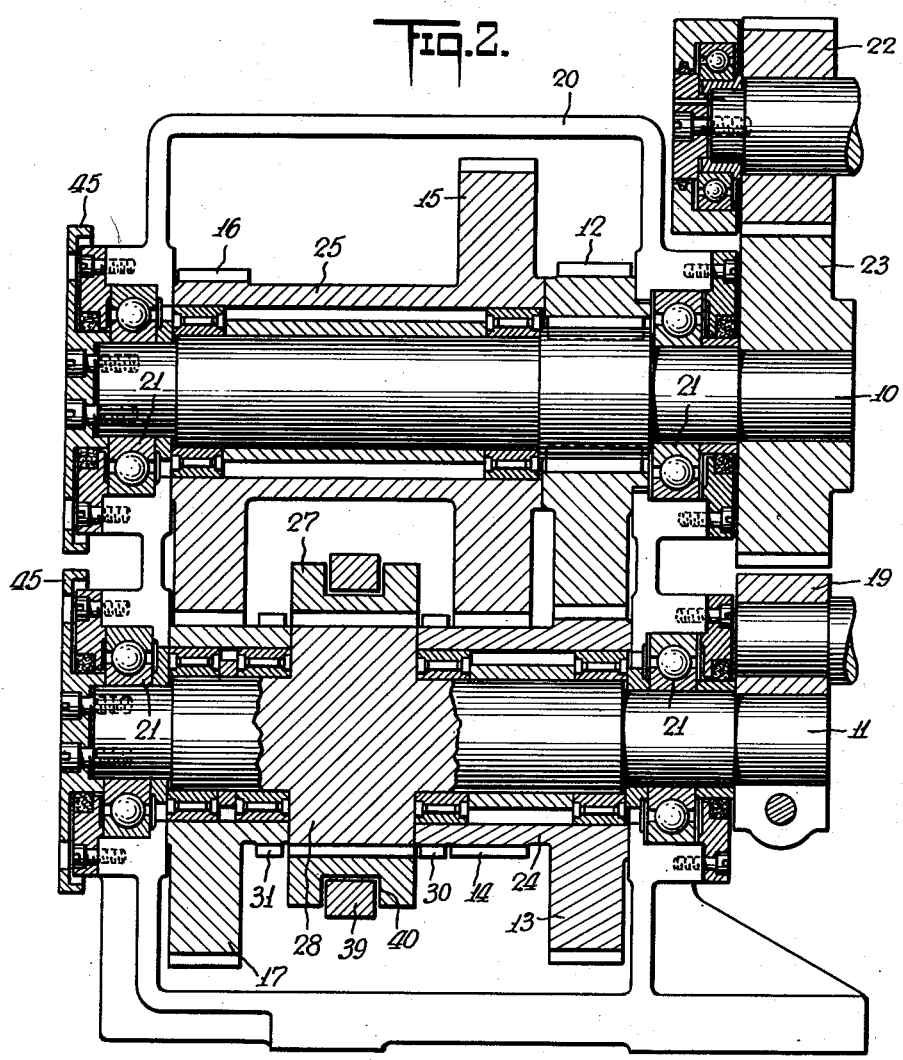
Figure 3:
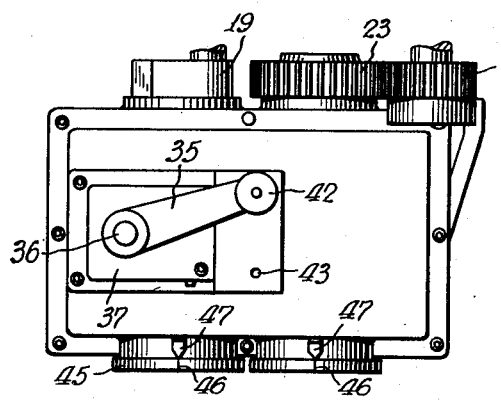

Various other objects, features and advantages of the invention will be apparent from the following particular description, and from an inspection of the accompanying drawings, in which:

Fig. 1 is a side elevation of a power transmission mechanism embodying my invention, certain parts being broken away and certain parts being shown in section, Fig. 2 is a section taken on line 2—2 of Fig. 1, and showing the speed change gearing in neutral position, Fig. 3 is a top plan view of the transmission mechanism, but on a smaller scale, Fig. 4 is a diagrammatic view, showing the position of various parts of the transmission mechanism, when the speed of the driven shaft is at its maximum, Fig. 5 is a view similar to Fig. 4, but showing the position of the various parts of the transmission mechanism, after the drive shaft has rotated one revolution from the position shown in Fig. 4, and Fig. 6 is a diagram showing a comparison of the angular velocities of the driven shaft in the two settings of the speed change gearing.

In the specific form of the invention illustrated in the drawings, the power transmission mechanism includes an input or drive shaft 10, a driven shaft 11, and a first variable speed ratio unit between said shafts, shown as a pair of intermeshing elliptical gears 12 and 13, having their major and minor radii in the ratio of 2:1. With this transmission means, while the drive shaft 10 rotates through one revolution at a constant speed, the driven shaft 11 will rotate through one revolution but at a variable speed, and will have a given maximum angular velocity at the phase or portion of the cycle shown in Figs. 2 and 4.

A speed change gearing is provided for changing the time cycle of the driven shaft in respect to the drive shaft. In the form shown, this gearing includes a pair of intermeshing circular spur gears 14 and 15, in series with the elliptical gears 12 and 13, and having a 2:1 speed ratio. When these spur gears 14 and 15 are connected for the transmission of power between the shafts, they will, in conjunction with the elliptical gears 12 and 13, drive the shaft 11 through one revolution at a variable speed for every two revolutions of the drive shaft at a constant speed. These spur gears 14 and 15 will therefore reduce the maximum speed of the driven shaft one-half at the phase thereof shown in Fig. 4, unless some compensating means is provided.

In order to neutralize the effect of the reduction gears 14 and 15 on the maximum speed of the driven shaft 11, there is provided a second variable speed ratio unit, shown as a pair of intermeshing elliptical gears 16 and 17 in series with the first pair of elliptical gears 12 and 13, and having their major and minor radii in the ratio of 2:1. When the drive is through both pairs of elliptical gears and the reduction gears 14 and 15, the shaft 11 will be driven at one-half the frequency of the shaft 10. However, the pair of elliptical gears 16 and 17 is arranged to correspond in position with the elliptical gears 12 and 13, in the portion of the cycle shown in Fig. 4, so that the maximum velocity of the driven shaft will be the same in this portion, regardless of the setting of the speed change gearing.

Figs. 1, 2 and 3 show the manner in which the various parts of the power transmission mechanism above described are desirably structurally constructed and arranged. As shown, the mechanism is enclosed in a suitable housing 20, with the two shafts 10 and 11 parallel and supported on suitable bearings 21. The drive shaft 10 may be driven from a source of power by any suitable means, as for instance a gear train, including the circular spur gears 22 and 23, and the driven shaft 11 may drive any suitable machine through a crank 19 or the like.

The elliptical gear 12 is fixed to the shaft 10, while the elliptical gear 13 is so constructed and so mounted, that it can be coupled to or uncoupled from the driven shaft 11 as will be later described.

The smaller speed change gear 14 is integral with or otherwise connected to the elliptical gear 13 to form therewith a sleeve 24, loosely supported by suitable bearings on the shaft 11. The larger speed change gear 15 encircles the shaft 10, and is integrally or otherwise connected to a sleeve 25 to the elliptical gear 16, said sleeve being rotatably supported by suitable bearings on said shaft. The other elliptical gear 17 is supported by suitable bearings on the shaft 11 for rotation with respect thereto.

The means for coupling either the first or the second transmission means between the shafts 10 and 11 includes a sleeve 27 keyed on the shaft 11, and adapted to interlock with the sleeve 24 or the elliptical gear 17. The central portion 28 of the shaft 11 may be in the form of a spur gear, and the sleeve 27 in the form of an internal gear, which may slide axially in either direction and engage gear teeth 30 on the sleeve 24 or teeth 31 on the hub of the gear 17. Other forms of clutch connections between the shaft 11 and the elliptical gear 17 of one pair or the elliptical gear 13 of the other pair may be employed. When the coupling sleeve 27 is moved into engagement with either one of the clutch gears 30 or 31, the corresponding transmission means will be cut into the line between the two shafts 10 and 11. When the clutch sleeve 27 engages the clutch gear 30, the power is transmitted from the shaft 10 to the shaft 11 through the gears 12 and 13 and the clutch. When the clutch sleeve 27 engages the other clutch gear 31, the power is transmitted from the shaft 10 to the shaft 11 through the gears 12, 13, sleeve 24, gears 14, 15, sleeve 25, gears 16, 17 and the clutch.

The axial shifting of the sleeve 27 into the desired speed change setting may be accomplished by any suitable means. As shown, there is employed a handle 35, connected to a pivot shaft 36, journalled on a frame plate 37 on the upper side of the housing 20. Fixed to this pivot shaft 36 is a bracket or arm 38, carrying a yoke 39 extending in a peripheral groove 40 of the sleeve 27. Connected to one end of the handle 35 is a spring-pressed plunger 42, adapted to extend into either of two holes 43, to determine the extreme axial positions of the sleeve 27 in coupling engagement with the clutch gears 30 or 31, and to hold said sleeve in either coupling position.

Means are provided for indicating a predetermined stopping position for the transmission mechanism, so that gear shifting may always be effected when the driven shaft is in a predetermined position. This is important in many types of machines, as for instance where the operating parts of the machine are driven by a reciprocating part, such as one driven by the crank 19. In the specific form shown, this means includes flanged plates 45, secured to the ends of the shafts 10 and 11 respectively for rotation therewith, and carrying indication marks 46 on their peripheries cooperating with pointers 47 secured to the housing 20. The indication marks 46 are desirably so positioned, that when both of them are in registry with their respective pointers 47, both pairs of elliptical gears will be in the same phase and the crank 19 will be in a predetermined position.

In the operation of the mechanism, when the coupling sleeve 27 is in engagement with the clutch gear 30 for a 1:1 frequency transmission, the shaft 11 will be driven at a variable speed as indicated by the curve A in Fig. 6. When the elliptical gears 12 and 13 are in the phase or position shown in Figs. 2 and 4, with the major axes thereof in alignment, and with the longer side of the gear 12 in mesh with the shorter side of the gear 13, the driven shaft 11 will rotate at a maximum angular velocity indicated by the points c, d and e in the curve A.

When the coupling sleeve 27 is in engagement with the clutch gear 31 for a 1:2 frequency transmission, the drive will be through the elliptical gears 12 and 13, reduction gears 14 and 15, elliptical gears 16 and 17, clutch gear 31, and coupling sleeve 27 to the shaft 11. In this setting of the speed change gearing, the shaft 11 will be driven at a variable speed, as indicated by the curve B in Fig. 6, and will make one revolution for every two revolutions of the drive shaft. When the elliptical gears 12 and 13 reach the position shown in Fig. 4, the second pair of elliptical gears 16 and 17 will be in the corresponding position, so that the angular velocity of the driven shaft at c and e will be the same as it was when driving through the first transmission means. At the end of one revolution of the drive shaft 10, the elliptical gears 12 and 13 will be in the position shown in Figs. 4 and 5, while the elliptical gears 16 and 17 will be in exactly the reverse position as shown in Fig. 5, so that the speed of the driven shaft 11 will be materially less than that in the 1:1 setting of the speed change gearing, as indicated by the point d' in curve B. At the end of the second revolution of the drive shaft 10, the two sets of elliptical gears will again be in the position shown in Fig. 4, and the driven shaft 11 will then again reach the same maximum velocity attained by the transmission in the 1:1 gear setting.

Thus there will be one point in the cycle of rotation of the driven shaft, where the angular velocity will be the same irrespective of whether the clutch be in one position or the other. In one case, this point is reached once in each revolution of the drive shaft, and in the other case, it is reached once in each two revolutions of the drive shaft.

Instead of using pairs of elliptical gears, any other means may be employed for giving variable angular velocity in the rotation, such as other shapes of gears, eccentric throw-cranks or the like.

Instead of elliptical gears, there may be employed other shapes of non-circular gears to give variations in the angular velocity of the driven member during its revolution. Or there may be employed other equivalent mechanisms, such as Geneva gears, variable throw-cranks, etc.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described the invention, what is claimed as new and desired to be secured by Letters Patent is:

1. A power transmission mechanism including a drive shaft, a driven shaft, a first transmission means between said shafts for driving said driven shaft with a given time cycle and at a given angular velocity at a portion of its cycle, a second transmission means between said shafts for driving said driven shaft with a different time cycle, but at the same angular speed at a said portion of its cycle, and means for coupling either one of said transmission means for drive operation between said shafts.

2. A power transmission mechanism including a drive shaft, a driven shaft, a first transmission means between said shafts for driving said driven shaft at a variable speed in each time cycle, a second transmission means between said shafts for driving said driven shaft at a variable speed and with a different time cycle, and means for coupling either one of said transmission means for drive operation between said shafts.

3. A power transmission mechanism including a drive shaft, a driven shaft, a first transmission between said shafts for driving said driven shaft at a variable speed in its time cycle and at a given maximum speed at one point in its cycle, a second transmission means between said shafts for driving said driven shaft at a variable speed and with a different time cycle, but at the same maximum speed at said point in the cycle of the driven shaft, and means for coupling either one of said transmission means for drive operation between said shafts.

4. A power transmission including a drive shaft, a driven shaft, transmission means between said shafts for driving said driven shaft at a predetermined angular velocity in one of its rotational phases, means for changing the frequency of rotation of said driven shaft, a variable speed ratio unit for neutralizing said frequency change at said rotational phase, to maintain the same predetermined angular velocity of said driven shaft at said phase, and means for cutting said variable speed unit selectively in or out of the transmission between said shafts, said transmission means being operable independently of said variable speed unit, to effect drive between said shafts when said latter unit is cut out from the transmission between said shafts.

5. A power transmission including a drive shaft, a driven shaft, transmission means between said shafts for driving said driven shaft at a predetermined angular velocity at one of its rotational phases, means for changing the frequency of rotation of said driven shaft, a variable speed ratio unit in parallel with a portion of said transmission means for neutralizing said frequency change at said rotational phase, to maintain the same predetermined angular velocity of said driven shaft at said phase, means for cutting said variable speed unit selectively in or out of the transmission between said shafts, and means for rendering said portion of said transmission means selectively operative or inoperative.

6. A power transmission mechanism including a drive shaft, a driven shaft, transmission means between said shafts for driving said driven shaft at a predetermined angular speed at one phase thereof, a speed change gearing for changing the frequency ratio between said shafts, a variable speed ratio unit having a speed ratio at said phase of the driven shaft inversely of the change in speed ratio effected by said gearing, and means for cutting said variable speed unit selectively in or out of the transmission between said shafts, said transmission means being operable independently of said variable speed unit when said latter unit is cut out of the transmission.

7. A power transmission mechanism including a drive shaft, a driven shaft, transmission means between said shafts for driving said driven shaft at a predetermined angular speed at one phase thereof, speed change gears for changing the frequency ratio between said shafts, a variable speed ratio unit in series with said speed change gears, and having a speed ratio at said phase of the driven shaft inversely of the change in speed ratio effected by said gears, and means for simultaneously cutting said variable speed unit and said gears selectively in or out of the transmission between said shafts.

8. A power transmission mechanism including a drive shaft, a driven shaft, transmission means between said shafts for driving said driven shaft at a predetermined angular velocity at one of its rotational phases, and including a variable speed ratio unit, a speed change gearing for changing the frequency ratio between said shafts, a second variable speed ratio unit for neutralizing said frequency ratio change at said rotational phase, to maintain the same predetermined angular velocity of said driven shaft at said phase, and means for effecting changes in said speed change gearing, and for simultaneously cutting said second variable speed ratio in or out of the transmission.

9. A power transmission mechanism including a drive shaft, a driven shaft, a pair of intermeshing elliptical gears driven by said driving shaft, a disengageable driving connection between said gears and said driven shaft, and a second disengageable driving connection between said gears and said driven shaft including a second pair of intermeshing elliptical gears, and means for engaging either one of said driving connections.

10. A power transmission mechanism including a drive shaft, a driven shaft, transmission means between said shafts for driving said driven shaft at a variable angular velocity, a speed change gearing, a pair of intermeshing elliptical gears in series with said speed change gears, and having a maximum speed differential ratio inversely of the speed ratio effected by said speed change gearing, said speed change gearing and said elliptical gears being connected in series, and means for connecting or disconnecting said elliptical gears and speed change gearing in series with said transmission means.

11. A power transmission mechanism including a drive shaft, a driven shaft, a first transmission means between said shafts for driving said driven shaft at a variable speed and at a 1:1 frequency ratio, and including a pair of intermeshing elliptical gears having the length of the major and minor radii in a 2:1 ratio, a second transmission means between said shafts for driving said driven shaft at a 1:2 frequency ratio with respect to the drive shaft, and including a second pair of elliptical gears having the length of the major and minor radii in a ratio of 2:1, and means for coupling either one of said transmission means for drive operation between said shafts.

12. In combination, a pair of parallel shafts, an elliptical gear connected to one of said shafts, a circular gear and a second elliptical gear connected together and rotatably mounted on said shaft, a third elliptical gear rotatably mounted on the second shaft and meshing with said second elliptical gear, a circular gear and a fourth elliptical gear connected together and rotatably mounted on said second shaft, the two circular gears being in mesh and the fourth elliptical gear meshing with the first elliptical gear, and means for preventing relative rotation of the second shaft and either of the elliptical gears mounted thereon.

13. A transmission gearing including a pair of shafts, two similar pairs of elliptical gears, a pair of circular gears, disengageable means for connecting said shafts through all three pairs of gears in series, and disengageable means for connecting said shafts through only one pair of said elliptical gears.

14. A transmission gearing including a driving member, a driven member, two pairs of elliptical gears and a pair of circular gears, one gear of each pair being co-axial with one shaft, and the other gear of each pair being co-axial with the other shaft, and clutch connections for driving from one shaft to the other through one pair of elliptical gears or through all of said gears.

15. A transmission gearing including a driving member, a driven member, two pairs of elliptical gears and a pair of circular gears, one gear of each pair being co-axial with one shaft, and the other gear of each pair being co-axial with the other shaft, and clutch connections for driving from one shaft to the other through one pair of elliptical gears or through all of said gears, said circular gears being of different pitch diameter, and the ratio of major and minor radii of each elliptical gear being the same as the ratio of the pitch diameters of said circular gears.

16. A transmission gearing including a driving member, a driven member, two pairs of elliptical gears and a pair of circular gears, one gear of each pair being co-axial with one shaft, and the other gear of each pair being co-axial with the other shaft, and clutch connections for driving from one shaft to the other through one pair of elliptical gears or through all of said gears, the pitch diameters of said circular gears being in the ratio of 2:1, and the ratio of the major and minor radii of each elliptical gear being also 2:1.

17. In combination, a pair of parallel shafts, an elliptical gear connected to one of said shafts, a circular gear and a second elliptical gear connected together and rotatably mounted on said shaft, a third elliptical gear rotatably mounted on the second shaft and meshing with said second elliptical gear, a circular gear and a fourth elliptical gear connected together and rotatably mounted on said second shaft, the two circular gears being in mesh and the fourth elliptical gear meshing with the first elliptical gear, and a sleeve slidable on said second shaft for locking either the third or the fourth elliptical gear to said second shaft.

18. A transmission including a pair of shafts, two similar units for driving at variable speed in the cycle of rotation, a unit for driving at uniform speed in the cycle of rotation, means for connecting all three units for transmission of power through all three units in series from one shaft to the other, and means for connecting only one of said units for transmission of power from one shaft to the other.

KARL SIEG.